United States Patent [19]

Huang

[11] Patent Number: 4,722,131
[45] Date of Patent: Feb. 2, 1988

[54] AIR CUSHION SHOE SOLE

[76] Inventor: Ing-Chung Huang, No. 15, Je Ho 1st Street, Kaohsiung, Taiwan R.O.C., Taiwan

[21] Appl. No.: 25,992

[22] Filed: Mar. 16, 1987

Related U.S. Application Data

[62] Division of Ser. No. 784,512, Oct. 4, 1985, Pat. No. 4,670,995.

[30] Foreign Application Priority Data

Mar. 13, 1985 [TW] Taiwan .............................. 74101035

[51] Int. Cl.⁴ .................... B29C 67/20; B29C 49/20; B29C 49/04; B32B 1/10
[52] U.S. Cl. ................. 29/450; 29/157.1 R; 156/244.11; 156/245; 264/512; 264/515; 264/516; 264/244
[58] Field of Search ............. 264/512, 515, 244, 46.6, 264/516; 29/157.1 R, 450; 156/244.11, 245

[56] References Cited

U.S. PATENT DOCUMENTS

| 2,080,469 | 5/1937 | Gilbert | 36/29 |
| 2,743,483 | 5/1956 | Parini | 264/516 |
| 3,005,272 | 10/1961 | Shelare et al. | 36/29 |
| 3,452,125 | 6/1969 | Schuman et al. | 264/529 |
| 3,655,849 | 4/1972 | Hayashi | 264/524 |
| 4,219,945 | 9/1980 | Rudy | 36/29 |
| 4,263,728 | 4/1981 | Frecentese | 36/129 |
| 4,546,899 | 10/1985 | Williams | 264/516 |

Primary Examiner—Jan H. Silbaugh
Assistant Examiner—Neil M. McCarthy
Attorney, Agent, or Firm—Holman & Stern

[57] ABSTRACT

An air cushion shoe sole which is preferably blow molded of elastomeric material and has at least one cavity which in cross-section is substantially rectilinear. The cavity has a number of depressions and each cavity has an air valve for introducing a shock absorbing material, namely gas, liquid, or a combination thereof into that cavity. Each air valve has means in it for automatically bleeding off a portion of the shock absorbing material introduced into the cavity once the pressure of that material reaches a predetermined level.

9 Claims, 37 Drawing Figures

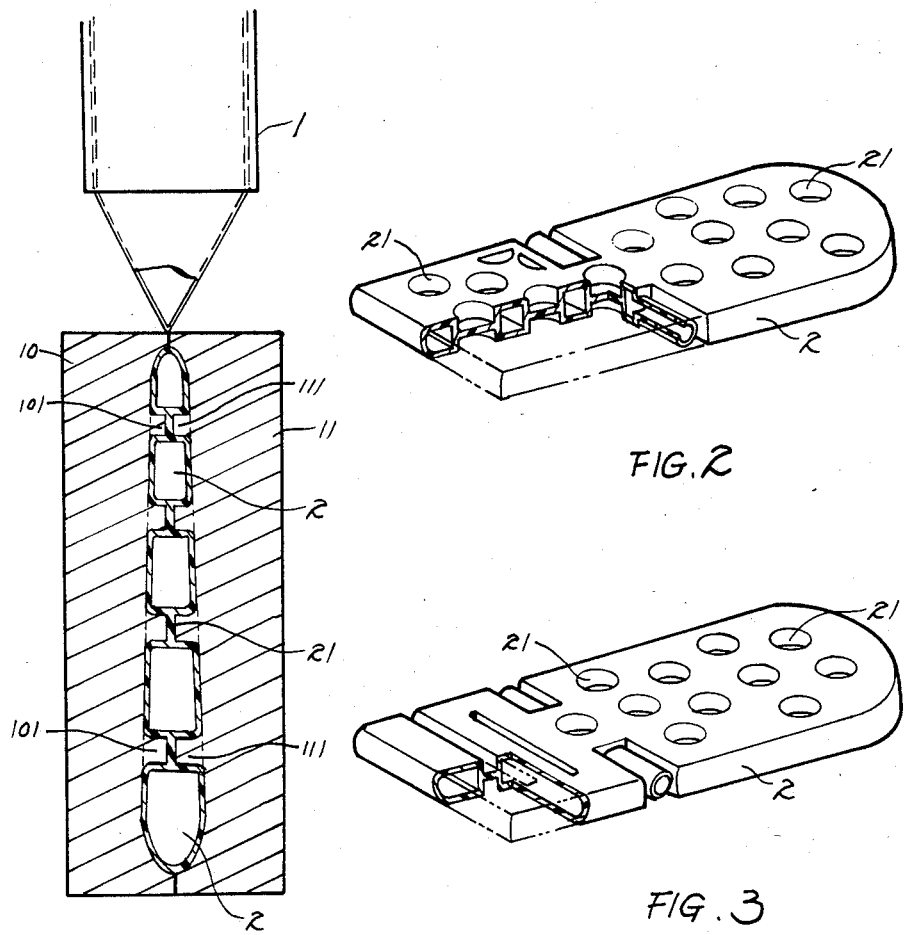
FIG. 2
FIG. 3
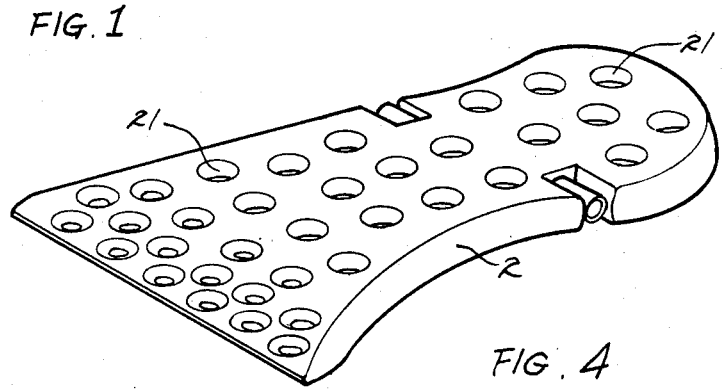
FIG. 1
FIG. 4

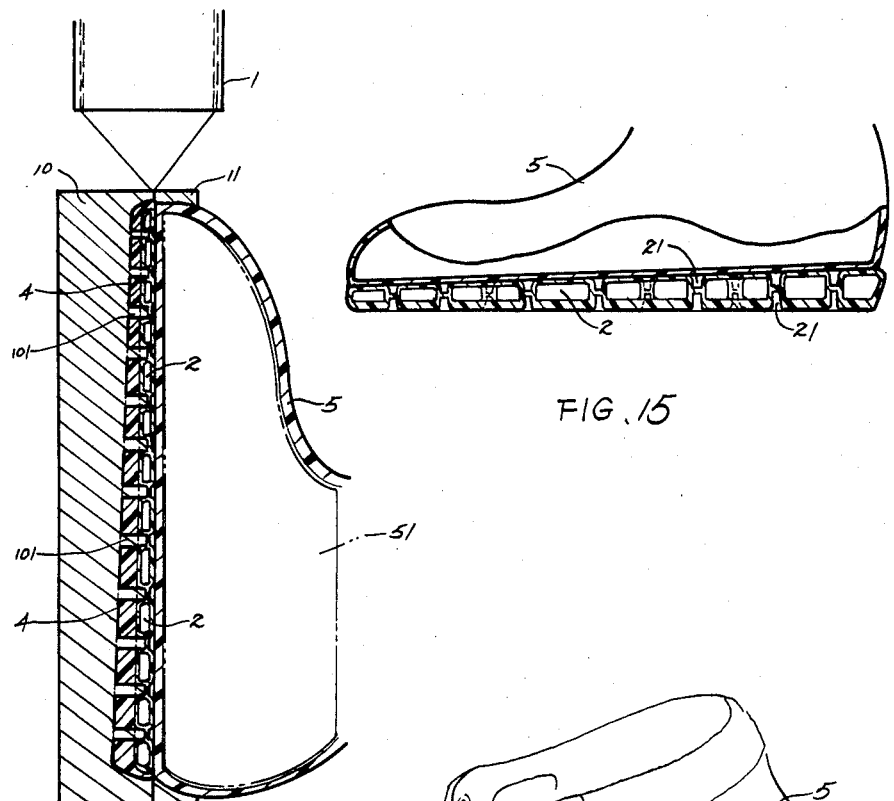
FIG. 13
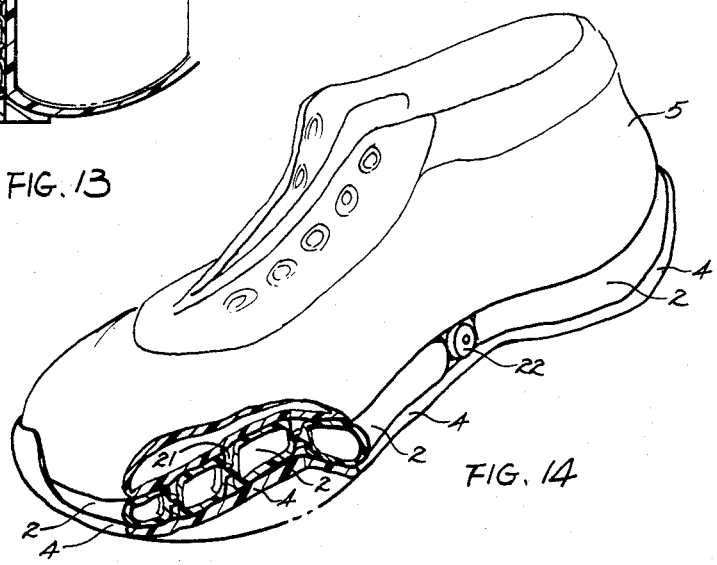
FIG. 15
FIG. 14

AIR CUSHION SHOE SOLE

This is a divisional of application Ser. No. 784,512 filed Oct. 4, 1985, which is now U.S. Pat. No. 4,670,995.

BACKGROUND OF THE INVENTION

The shock absorption of an athletic shoe depends primarily upon the material used for the sole of that shoe. Moreover, the weight of such a shoe is primarily effected by the weight of the sole as that is usually the heaviest component of the shoe. There has been an evolution in the sports shoe industry to obtain a lighter and more shock absorbent athletic shoe.

Light weight elastomeric materials such as polyurethane are now used to make the soles but such materials each have a certain density and elasticity and hence can only approximate the optimum characteristics for the weight of the user of that shoe. It is important to keep in mind that as the weight of each person wearing athletic shoes varies, this translates into a substantially different downward force, which force is concentrated in the sole of the shoe. Present shoes cannot be "tuned" or "tailored" to the particular degree of activity the user wishes to subject his feet to or the weight of the user and therefore shoes are made to a common denominator.

In order to prevent damage to the foot, the manufacturers have worked out combinations of two or more materials having different elasticities and have molded shoe soles out of these materials. Of course, when a sole is made up of two or more materials having different characteristics, the juxtaposition of these materials is unchangeable and therefore that particular shoe will always have the same characteristics. Again, such a shoe cannot be altered once manufactured and therefore cannot be tailored to the needs of the wearer.

The industry has produced shoes with air cushions and this has been an advantage because the air cushions act as a shock absorber. When the localized upward force is directed to a portion of the sole, for example if a runner were to step on a rock, the upward force vectors are absorbed by the air cushion and more evenly distributed throughout the air cushion cavity to a larger surface of the foot of the wearer. Normally, the air cushion is filled with air and is inflated at the factory to a predetermined pressure and has no means of adjusting that pressure. See for example U.S. Pat. No. 2,080,469. Moreover, if the air cushion were punctured, there is no vertical support to the air cushion once it is punctured and therefore the cushion deflates and the shoe becomes useless. Manufacturers have made some air tubes in shoes with a tire valve in them, see U.S. Pat. No. 3,005,272, but this proves an inconvenience having to go to a gas station to inflate the shoe, and again if there is a puncture, the air cushion collapses. Another development was to fill the cushion cavity with various types of specialized gases and encapsulate the cushion within foam material, see U.S. Pat. No. 4,219,945 but again, when punctured, the air cushion loses its vertical support. Another approach to shock absorbing air cushions was to develop a two stage shock absorbing shoe sole as seen in U.S. Pat. No. 4,263,728 and again, if punctured, the shoe lost its value.

The prior development of air cushion shoes failed to provide an air cushion that would have vertical support even if it was punctured so that the shoe would still have use if punctured, which many times happens. Moreover, the air cushions of the prior developments either were factory sealed to a given pressure and had no means whereby pressure adjustment could be made, or had metal tire valves or other types of air valves in them. The metal tire valves were difficult because they had to be embedded within the plan profile of the sole and hence affected the performance of the shoe and could be usually felt by the wearer. The other valves were usually one way valves, and could not or certainly the developers did not teach that the air in the air cushion could be adjusted to the wearer's needs and hence the shoe could not be tailored to the person wearing the shoe. None of the prior developments taught an air valve which had an automatic bleed off means so that if the pressure in the air cushion cavity got to a predetermined level, the pressure could automatically bleed through the air valve thereby further absorbing the shock which caused the pressure increase.

The method of manufacturing an air cushion for prior development include more than two processes. The air cushion must be made in two pieces and sealed together. That caused higher cost and lost time.

BRIEF SUMMARY OF THE INVENTION

The instant invention is drawn to a method for manufacturing an air cushion which in cross section is substantially rectilinear and which is preferably made by blow molding. The vertical support of the cushion is determined by the composition and thickness of the elastomeric material for the cushion cavity and generally the thickness is 0.5 mm to 2 mm. A factor of the vertical support of the air cushion also is the number of vertical supports that are molded into the air cushion in the form of depressions. The vertical support of the material forming the cushion is based on the relationship $f = \frac{1}{2} ks$, where f is the average force of compression, k is a constant known as the stiffness coefficient of the elastic potential energy of the compressed material, and s is the distance the material has been compressed.

When blow molding an air cushion shoe sole, the elastomeric material is extruded as a tube into a mold, which mold has the shape the air cushion is to assume. The mold then closes and gas is injected into the tube made of elastomeric material so as to inflate it so that it takes the shape of the mold. In this way a substantially rectilinear cavity in cross section can be formed. Blow molding is preferred, but it is also possible to use vacuum molding.

It is possible when blow molding, to have a preformed bottom sole placed in the mold; place adhesive on that portion of the bottom sole which will be in contact with the tubular material to be blow molded, and thereby simultaneously blow mold the air cushion and adhere it to a bottom sole portion. Likewise, the shoe upper can be also simultaneously adhered to the air cushion as it is molded.

The molded air cushion has at least one lateral cylindrical space molded into it which space can accept an air valve. The air valve accepts a normal ball air needle and has an automatic bleed off means whereby the air in the air cushion cavity can escape when it reaches a predetermined pressure. The predetermined pressure is of the order of 40–100 psi and the preferred pressure to be maintained in the air cushion is 20–40 psi.

It is possible to mold an air cushion with two or more cavities, each having an air valve so that each of the air cushion cavities can be inflated to a predetermined level, perhaps different than the other air cushion cavity.

A two-stage air cushion different from U.S. Pat. No. 4,263,728 can be made by blow molding. The two stage air cushion has a center thinner than the outer portion. When in loading condition the center will move downward, after reaching the running surface then the whole air cushion acts to absorb the load.

When manufacturing a two stage air cushion with a flat outsole there is an air passage through the sole. The two stage air cushion can act as an air pump, so as to bleed the air in and out of the shoe.

It is possible, but not necessary, to encapsulate the molded air cushion in foam material for appearance and for additional vertical support. The air cushion is molded with a plurality of depressions in it, which depressions go through the vertical height of the air cushion and thereby give vertical support. The air cushion can also be molded with a thick bottom portion so that the bottom portion becomes the portion of the shoe sole that touches the ground. The top surface of the molded air cushion is substantially planar so that there is even weight distribution from the foot of the wearer to the air cushion which assists in the vertical stability of the air cushion.

BRIEF DESCRIPTION OF THE DRAWINGS

FIG. 1 is a cross sectional view of a mold and extruder used to make the air cushion shoe sole;

FIG. 2 is a perspective view of a half sole air cushion in partial cross section;

FIG. 3 is a perspective view of a second embodiment of a half sole air cushion;

FIG. 4 is a perspective view of a third embodiment half sole air cushion;

FIG. 13 is a cross section of a third embodiment of the mold showing simultaneous manufacture of the shoe bottom and the shoe upper with the air cushion;

FIG. 14 is a perspective partial cross section view of a shoe made in accordance with the mold in FIG. 13;

FIG. 15 is a partial cross sectional view of an air cushion, the bottom portion of which forms the bottom of the shoe;

FIG. 32 is a plan view as in FIG. 31 condition showing the air flow bleeding in;

DETAILED DESCRIPTION OF THE PREFERRED EMBODIMENTS

Figure 5:
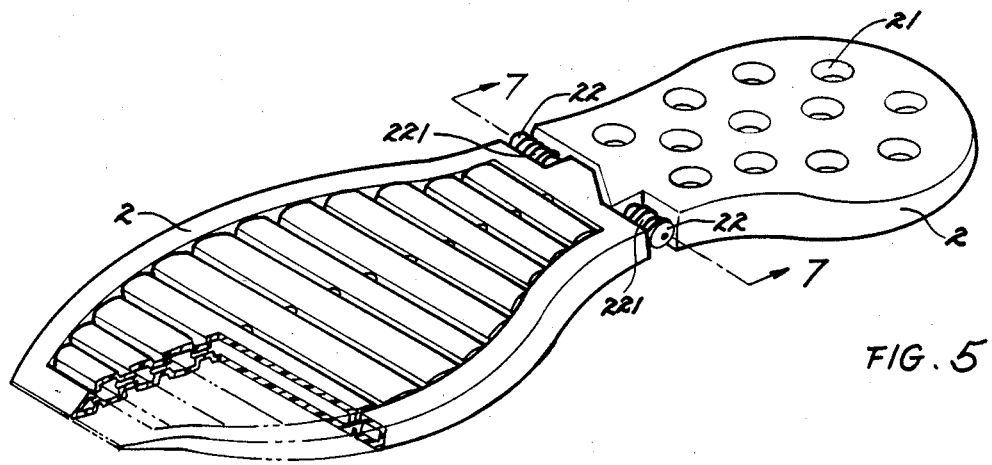
FIG. 5 is a perspective view of a whole sole having two separate air cushions and two separate air valves, the front part of the sole being in partial cross section.

The cubical air cushion of the instant invention is preferably formed by blow molding. An extruding molding machine 1 extrudes a tube of elastomeric material which is then inserted into a split mold 10, 11. The split mold has protrusions 101 and 111 opposite each other which form depressions 21 in the molded air cushion 2. The spacing of the protrusions 101 and 111 is such that a web of elastomeric material is formed at the bottom of the depressions 21 FIGS. 1-5.

The material used as the elastomeric material to form the air cushion can be selected from the following: polyurethane, polyethylene/ethylene vinyl acetate copolymer, polyester elastomer, chlorinated polyethylene, polyvinyl chloride, chlorsulfonated polyethylene, or neoprene. Preferably polyurethane or ethylene vinyl acetate is used. The air cushion is filled with a shock absorbing material and this shock absorbing material can be liquid, gas, or a combination thereof. For ease of availability, air is preferred as the gas and water is preferred as the liquid. If the air cushion is encapsulated in foam material, such materials can be made out of polyurethanes, polyproylene/ethylene vinyl acetate copolymer, neoprene or polyester. Polyurethanes or polyethylene/ethylene vinyl acetate copolymers are preferred.

Figure 21:
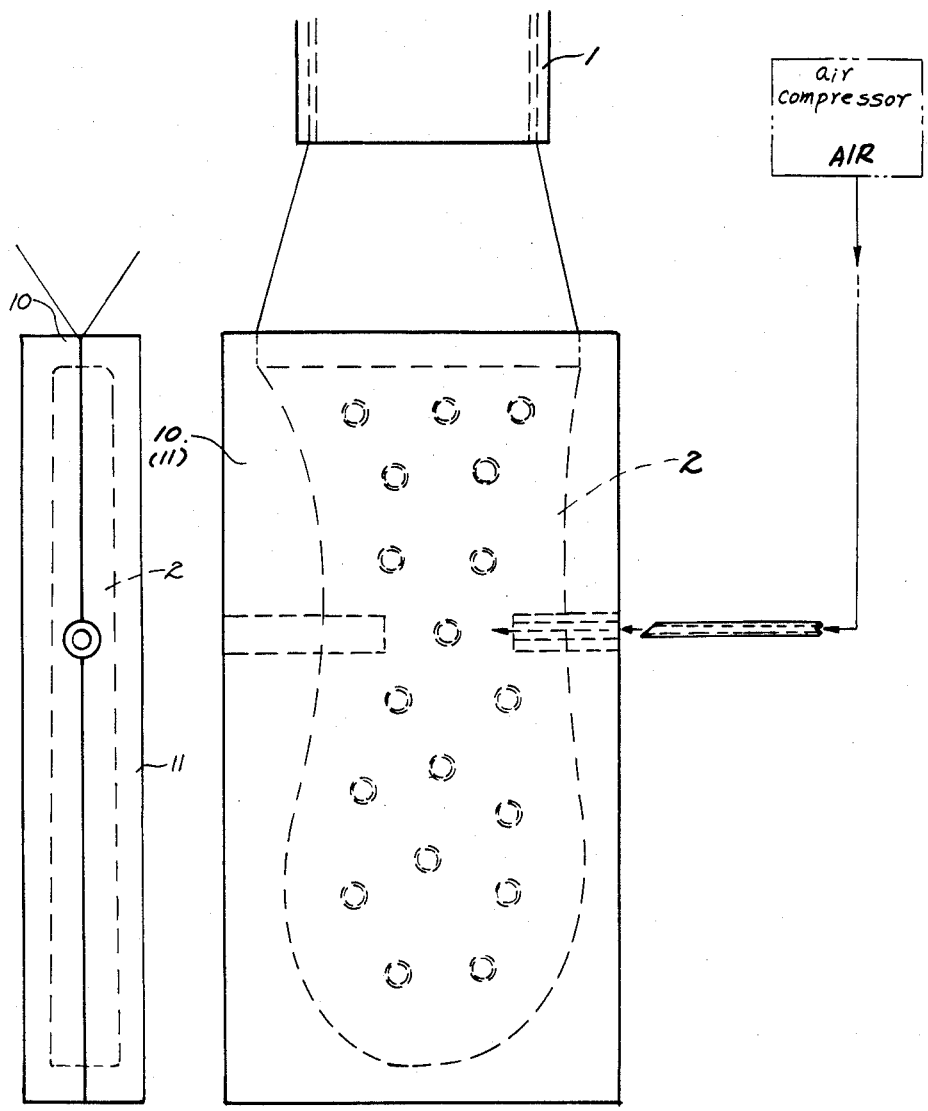
FIG. 21 is a plan view and vertical view showing the compressed air blown in the die through a needle.

Once the elastomeric material is in the mold, an air needle, as shown in FIG. 21, is inserted into the center of the tube and the elastomeric material is blow molded to the shape of the mold. In this way the eventual air cushion as seen, for example, in FIGS. 2, 3 or 4 will take the shape of the mold and has a substantially rectilinear cavity in cross section, a plurality of depressions, and a substantially planar top surface. This gives substantial vertical support to the air cushion so that the air cushion can substantially support the weight of the wearer with no inflation. Moreover, the strength of the air cushion blow molded in this fashion is such that it can be inflated up to about 40 psi and more without altering its shape, i.e., blowing up like a balloon.

Figure 20:
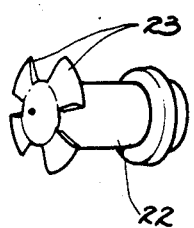
FIG. 20 is a perspective view of an air valve.
Figure 7:
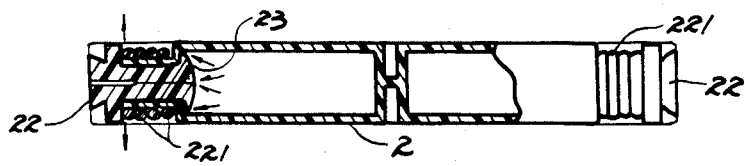
FIG. 7 is a partial cross section taken along 7—7 in FIG. 5 showing the air valve and elastic rings.
Figure 8:
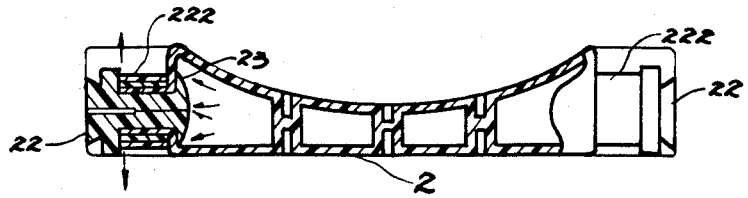
FIG. 8 is a partial cross section taken along 8—8 in FIG. 6 showing the air valve and elastic tubes.

FIGS. 7 and 8 show the air valve 22 (best seen in FIG. 20) which is placed in a lateral cylindrical space molded in the air cushion. The air valve 22 has a stem which is coaxial with the cylindrical space and has a flange 23 with cutouts in the flange. When the stem is introduced into the air cushion cavity and the cavity is pressured, the pressure from the cavity seals the needle aperture and pushes the flange against the inside surface of the cavity thereby mechanically interlocking the air valve in the cavity. A plurality of elastic o-rings 221 as seen in FIG. 7 or elastic tubes 222 as seen in FIG. 8 are placed about the lateral cylindrical portion of the air cushion so as to prevent the shock absorbing material from escaping from the air cushion cavity to ambient. The size and plurality of the rings 221 or tubes 222 are chosen so that when the pressure in the air cushion cavity reaches a predetermined amount, it will overcome the radially inward force of the rings or tubes and allow air from the cavity to pass through the cutouts in the flange, between the stem and the lateral cylindrical tube of the air cushion, and vent to the outside. This forms an automatic bleed off of shock absorbing material when it reaches a pressure above a predetermined level in the air cushion cavity.

In the air valve 22, there is a central longitudinal aperture that accommodates an air needle such as universally used for pumping up balls, etc. Air, water, or a combination of air and water can be easily inserted through such a needle and consequently the air cushion cavity can be inflated to the desired pressure. If the predetermined level of pressure is exceeded, such as if the wearer pumps in too much air of if the wearer steps on a stone, there will be an automatic bleeding of the excess pressure from the cavity.

Figure 6:
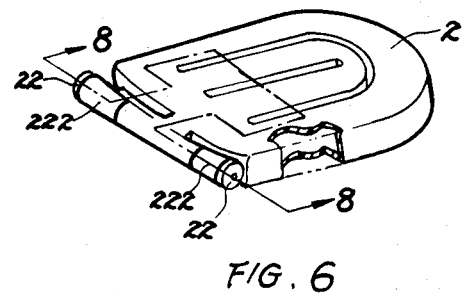
FIG. 6 is a perspective view of the half sole air cushion in partial cross section having a concave top planar surface.

FIG. 6 and FIG. 8 show an air cushion for placement in the heel portion of the shoe which air cushion has a concave top surface. Both FIGS. 7 and 8 show two air valves and it is to be noted that there is one air cushion cavity for each air valve so that each cavity can be inflated to a different pressure.

Figure 9:
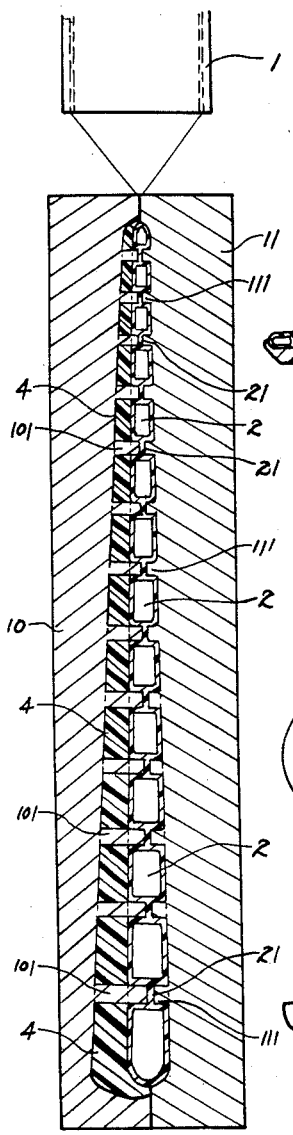
FIG. 9 is a cross section of a second embodiment of the mold showing simultaneous manufacturing of the shoe bottom and the air cushion.
Figure 10:
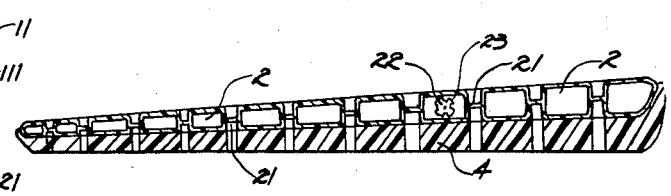
FIG. 10 is a cross sectional view of the shoe sole made in the mold of FIG. 9.

FIG. 9 shows a second embodiment of a split mold 10 and 11 wherein a preformed rubber sole 4 is placed in the mold and the rubber sole has cutouts in it. Protrusions 101 go through the cutouts and into the mold cavity thereby producing the depressions 21 when the elastic material is molded. An adhesive is placed between the air cushion 2 and the rubber sole 4 so that when the air cushion is blow molded, it simultaneously adheres to the rubber sole forming a composite air cushion shoe sole. A cross section of that shoe sole is shown in FIG. 10.

Figure 11:
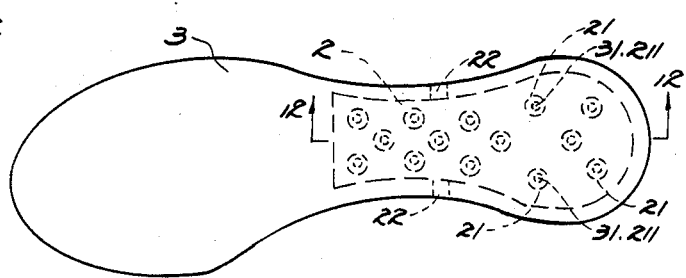
FIG. 11 is a top plan view of a shoe sole having an encapsulated air cushion.
Figure 12:
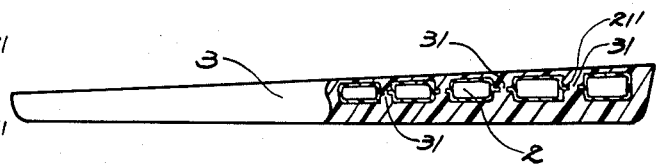
FIG. 12 is a vertical view of the shoe sole of FIG. 11 showing cross section along lines 12—12.

FIGS. 11 and 12 show an air cushion 2 that has been encapsulated in polyurethane foam 3, preferably by injection molding the foam about the air cushion. It is possible to punch holes 211 in the web between depressions 21 so that when the foam material 3 is injection molded about the air cushion, the entraped air in the depressions 21 escapes through the holes 211 and the foam material completely fills the depressions to form rods 31. Therefore the depressions, with the foam material increase the vertical support. Also, by encapsulating the air cushion, the amount of pressure that the air cushion can be inflated to is increased before it will misshape. It is possible to inflate the air cushion up to about 100 psi if it is desired to have an extremely hard and stiff air cushion. Of course, the elastic rings 221 or tubes 222 will have to be adjusted accordingly.

FIGS. 13 and 14 show a third embodiment of the mold wherein a shoe upper 5 containing a shoe mold 51 is placed in part of the mold 11 and a bottom sole 4 is placed in the other part 10. The elastomeric material is then introduced into the mold, the mold is closed and adhesive is applied to those surfaces of the upper 5 and the shoe bottom 4 that contact the air cushion. The blow molding of the air cushion simultaneously adheres the air cushion 2 to the bottom portion 4 and the upper 5 and the complete shoe is thereby made. It will be seen from FIG. 14 that the air cushion 2 forms the foxing of the shoe. It is of course possible to injection mold a foxing material about the air cushion for decorative purposes.

FIG. 15 shows an air cushion which has a thick bottom portion and the bottom portion becomes the bottom of the shoe. The air cushion of the shoe of FIG. 15 can be made simultaneous with the adhering to the shoe upper 5, for example, in a mold as seen in FIG. 13 which has a bottom sole 4 in it. Alternatively, the air cushion can be made separate as in the mold of FIG. 1 and then, separate from the molding process, be attached to the shoe upper 5. Furthermore, the material that the air cushion is made out of is selected to have the strength and wear resistance so that it can act both as an air cushion and as a bottom sole material.

Figure 16:
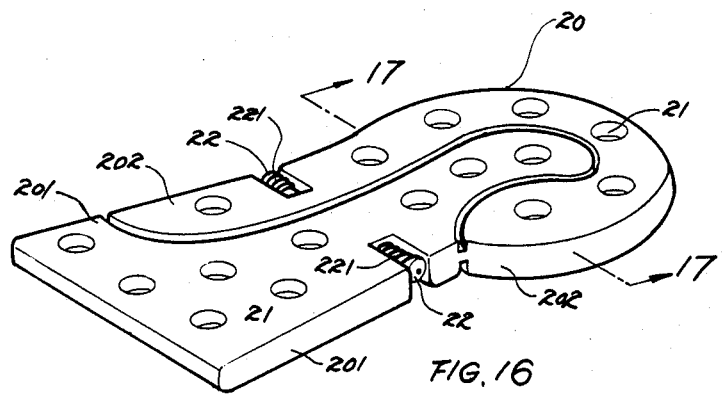
FIG. 16 is a perspective view of another embodiment of a two cavity air cushion having two air valves.
Figure 17:
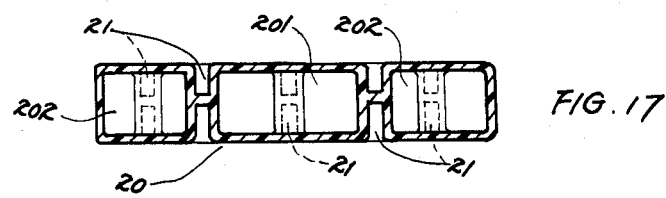
FIG. 17 is a cross sectional view taken along 17—17 of FIG. 16.

FIGS. 16 and 17 show another embodiment of an air cushion having two cavities 201 and 202, each cavity having an air valve 22. It is possible to selectively adjust the pressure in each cavity so long as the pressure is below the bleed off pressure determined by the rings 221 on the air valve. Each of the cavitities can be selectively adjusted by the wearer of the shoe depending upon the particular sport he is indulging in.

Figure 18:
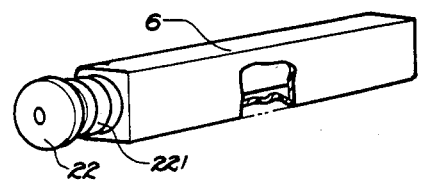
FIG. 18 is a perspective view with partial cross section of an air cushion.
Figure 19:
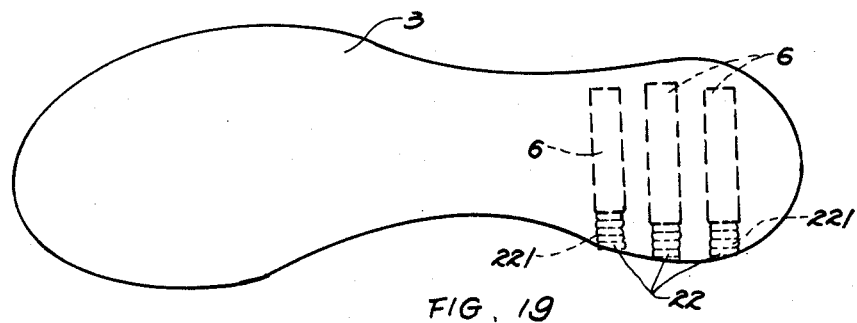
FIG. 19 is a plan view of an air cushion sole showing the air cushions of FIG. 18 encapsulated therein.

FIGS. 18 and 19 show still a further shape of the cushion designated as 6 and that a plurality of these simplified air cushions can be encapsulated in a foam sole 3.

Figure 22:
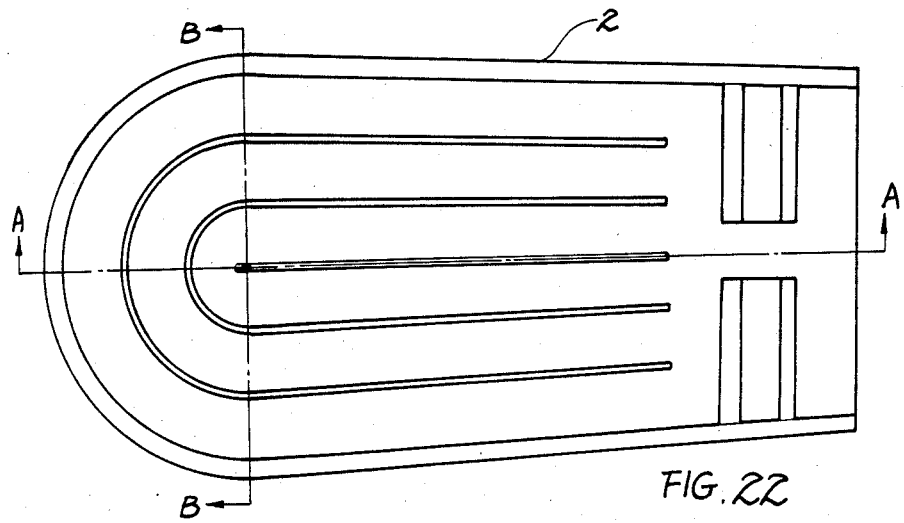
FIG. 22 is a plan view of a two stage half sole air cushion.
Figure 23:
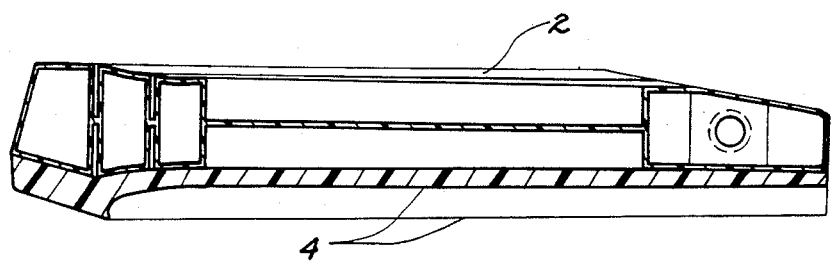
FIG. 23 is a cross sectional view taken along the line A—A of FIG. 22.
Figure 24:
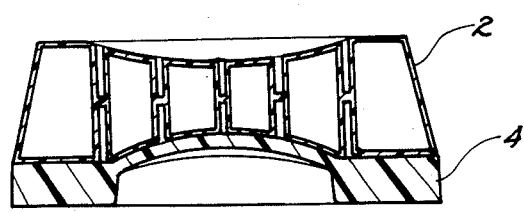
FIG. 24 is a cross sectional view taken along the line B—B of FIG. 22.

FIGS. 22-24 showing an air cushion for placement in heel portion of the shoe which has a concave surface in the center. This air cushion can be designed as a two stage air cushion or a pumpable air cushion depending on whether the bottom surface of the outsole is concave or flat.

Figure 25:
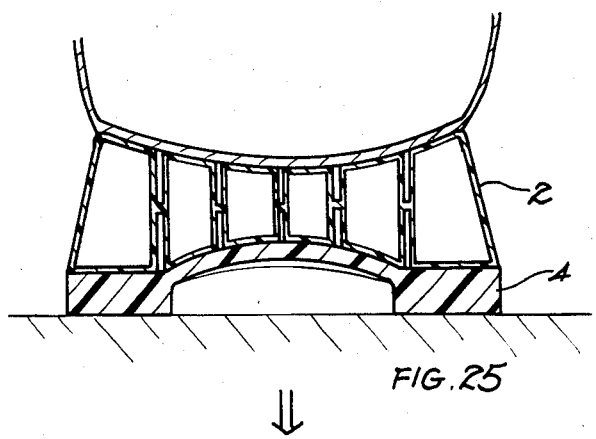
FIG. 25 is a cross section of a two stage air cushion shoe through the heel portion of an inflated air cushion being in no load condition.
Figure 26:
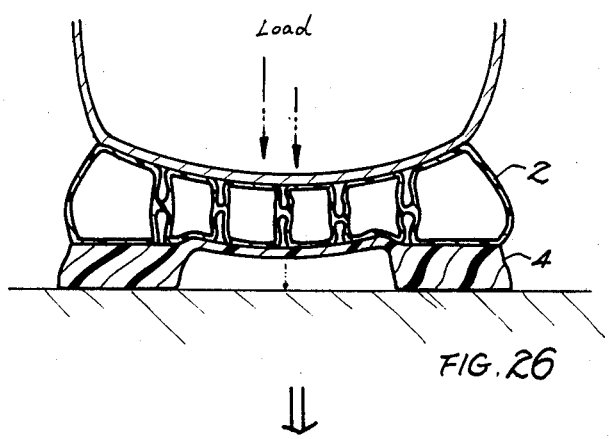
FIG. 26 is a view similar to FIG. 25, having the first-stage cushion.
Figure 27:
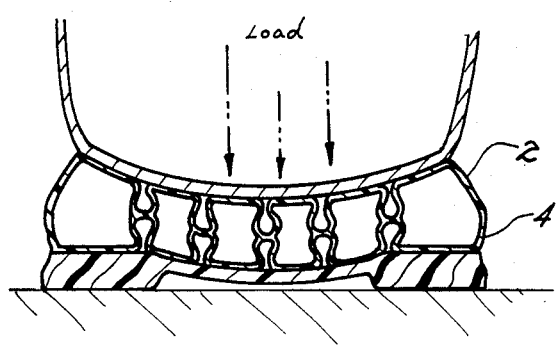
FIG. 27 is a view similar to FIG. 25, having the second-stage cushion.
Figure 28:
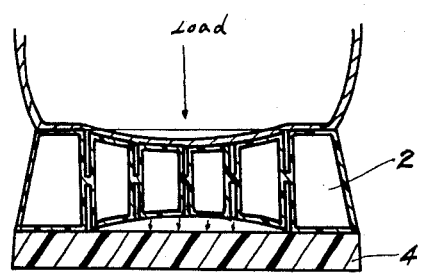
FIG. 28 is cross sectional view of a pumpable air cushion shoe through the heel portion.

FIGS. 25-27 show sequential loading of the heel on the two stage air cushion construction.

FIG. 26 shows a light load condition pushing the center of the air cushion downward. FIG. 27 shows that when a light load goes to a heavy load condition, the whole air cushion deforms. The first stage of absorption is the deforming of concave bottom surface. The second stage is when the concave bottom flattens out and the air cushion continues to deform.

Figure 29:
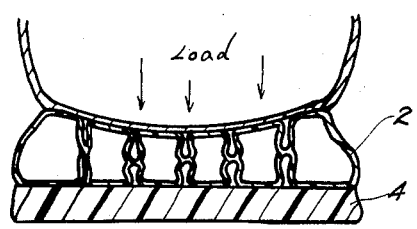
FIG. 29 is a cross sectional view showing the air cushion under a load condition.
Figure 31:
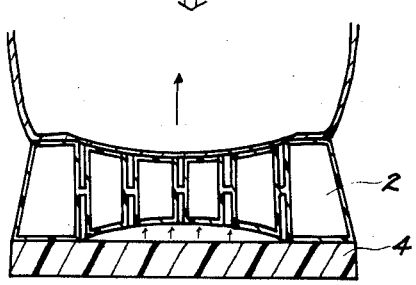
FIG. 31 is a cross-sectional view showing the air cushion is recovering after removal of the load condition.
Figure 30:
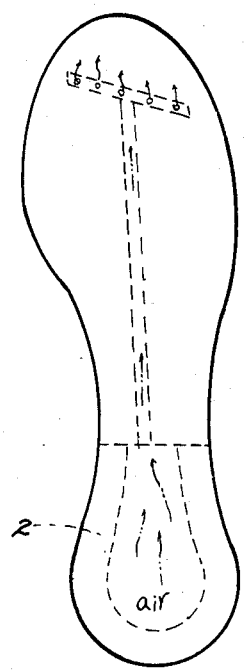
FIG. 30 is a plan view as in FIG. 29 condition showing the air is blown off from the shoe sole and goes into shoe upper.
Figure 32:
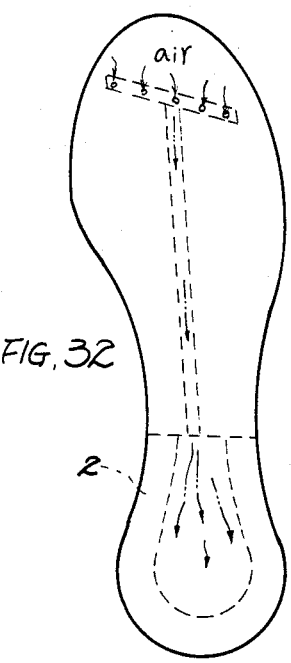
Figure 36:
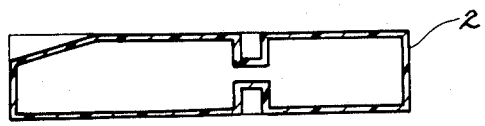
FIG. 36 is a cross sectional view taken along the line B—B of FIG. 33.
Figure 33:
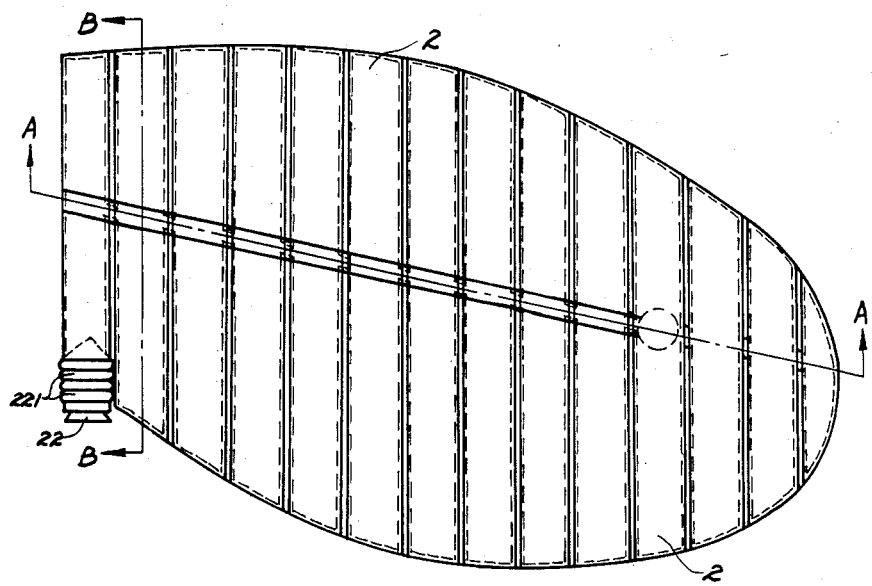
FIG. 33 is a plan view of the front part of a flexible air cushion.
Figure 34:
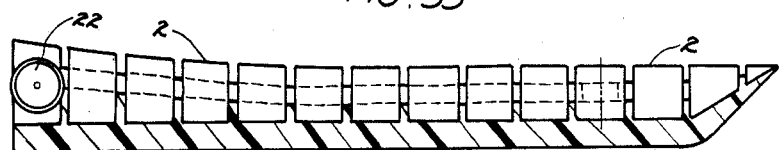
FIG. 34 is a vertical view of FIG. 33 in partial cross section.
Figure 35:
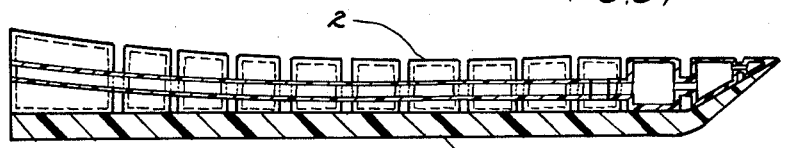
FIG. 35 is a cross sectional view taken along the line A—A of FIG. 33.
Figure 37:
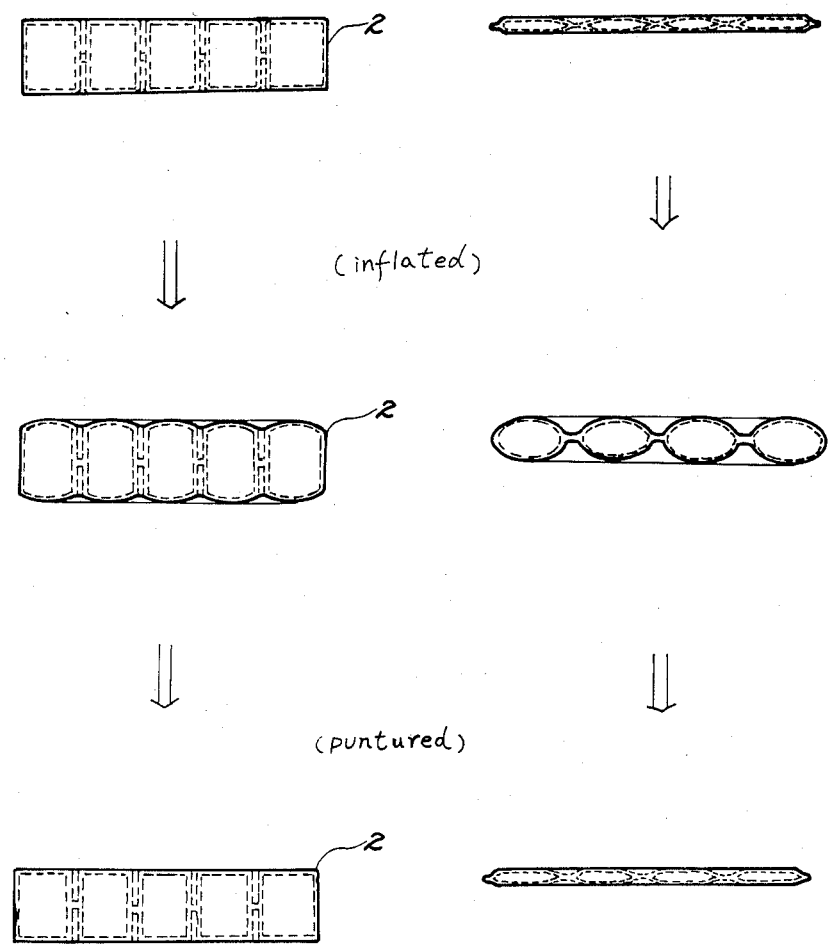
FIG. 37 is a drawing showing the difference between our blow molded air cushion and the prior air cushion that is made by two sheets and sealed together.

FIGS. 28-32 showing sequential loading of the heel on the pumpable air cushion when an air cushion as seen in FIG. 22 is adhered with a flat outsole having an air passage through the sole as shown in FIGS. 30 and 32 FIG. 29 shows a load condition that forces the center of air cushion downward and bleeds off the air existing between outsole and air cushion. The air will flow into the shoe through the air passage as shown in FIG. 30.

FIG. 31 shows the load condition being removed and the air cushion takes in the air from the shoe and the air re-enters the air passage as shown in FIG. 32. The effect of exhausting and intaking air will make the air circulate in the shoe and cool wearer's feet.

FIGS. 33-36 show an air cushion which has the best flexibility because of the air cushion compartments alignment.

The above preferred embodiments are by way of illustration only and other embodiments or modifications within the scope of this invention and which would be obvious in light of this disclosure to people skilled in the art are meant to be covered by the following claims.

What I claim is:

1. A method of forming an air cushion shoe sole comprising positioning elastomeric material in a split mold, which when it is in closed position, defines at least one substantially rectilinear cavity in cross-section, the cavity having a plurality of depressions, at least the top surface being substantially planar, and having at least one lateral cylindrical space; bringing the mold together and molding a hollow air cushion having a shape commensurate with the mold and including a lateral cylindrical shape; introducing an air valve in the molded lateral cylindrical shape; then introducing a shock absorbing material into said hollow air cushion to pressurize said hollow air cushion; and providing means in said air valve for automatically bleeding off a portion of the shock absorbing material in said hollow air cushion once the pressure therein reaches a predetermined level.

2. The method as claimed in claim 1, wherein said elastomeric material is extruded into a cylindrical shape; and introducing gas into said cylindrical shape when it is in the closed mold so as to expand the elastomer to the shape of the mold.

3. The method as claimed in claim 2, further comprising seating said air valve in said lateral cylindrical shape so as to form longitudinal passages connecting said cavity and ambient between the outer periphery of a stem of the air valve and the inner surface of said lateral cylindrical shape when cavity pressure reaches the predetermined level.

4. The method as claimed in claim 3 further comprising placing elastic means about said lateral cylindrical shape so as to bias inwardly against said air valve stem thereby effectively closing said longitudinal passages, the inward force of said elastic means determining said predetermined pressure level.

5. The method as claimed in claim 2, wherein the molding forms at least two separate cavities each being provided with an air valve so that each cavity can have a different predetermined pressure level.

6. The method as claimed in claim 2 further comprising selecting the thickness, composition, and number of depressions molded into said air cushion such that should a puncture occur in said cavity releasing the pressure therein, the air cushion would still support the weight of the wearer.

7. The method as claimed in claim 2, wherein said elastomeric material is selected from the group consisting of polyurethane, polyethylene/ethylene vinyl acetate copolymer, polyester elastomer, chlorinated polyethylene, polyvinyl chloride, chlorosulfonated polyethylene, or neoprene and said shock absorbing material is selected from the group consisting of gas, liquid or combinations thereof.

8. The method as claimed in claim 2 further comprising introducing a preformed sole bottom in said mold; placing adhesive between the elastomeric material and said sole bottom so that simultaneously with the forming of said air cushion the sole bottom is adhered to the lower surface thereof.

9. The method as claimed in claim 8 further comprising introducing a preformed shoe upper in said mold; placing adhesive between the elastomeric material and said shoe upper so that simultaneously with the forming of said air cushion the shoe upper is adhered to the upper substantially planar surface thereof.

* * * * *